United States Patent
Muthu et al.

(10) Patent No.: US 9,264,317 B2
(45) Date of Patent: Feb. 16, 2016

(54) SCALABLE MAP DISPLAYS

(75) Inventors: Suresh Muthu, San Jose, CA (US); Naveen Kondapalli, San Ramon, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 120 days.

(21) Appl. No.: 13/554,823

(22) Filed: Jul. 20, 2012

(65) Prior Publication Data
US 2014/0022275 A1    Jan. 23, 2014

(51) Int. Cl.
*G09G 5/00* (2006.01)
*H04L 12/24* (2006.01)

(52) U.S. Cl.
CPC ............... *H04L 41/22* (2013.01); *H04L 41/12* (2013.01); *H04L 41/082* (2013.01)

(58) Field of Classification Search
USPC .................................................. 345/440, 619
See application file for complete search history.

(56) References Cited

U.S. PATENT DOCUMENTS

| | | | |
|---|---|---|---|
| 2010/0050131 A1* | 2/2010 | Weise et al. | 715/853 |
| 2010/0106752 A1* | 4/2010 | Eckardt et al. | 707/805 |

OTHER PUBLICATIONS

Johnson et al.; "Treemaps: a space-filling approach to the visualization of hierarchical information structures"; Oct. 1991; Proc. of the 2nd Internation IEEE Visualization Conference p. 284-291.*

* cited by examiner

*Primary Examiner* — Peter Hoang
(74) *Attorney, Agent, or Firm* — Blank Rome, LLP

(57) ABSTRACT

A desired node is selected from a tree structure or list and then a number of levels from that node are displayed in a map. For edge nodes, the number of undisplayed links from that node is displayed. When another node is selected on the map, the number of levels is recalculated based on that node or the existing nodes remain and the desired level is additionally displayed from the selected node. Multiple nodes can be selected from the list, which may result in separated islands which join when an common node is displayed in each island. Filters can be applied to limit the number of nodes. The filtering may either remove nodes from the display or provide an indication of the number of undisplayed nodes meeting the filter and any displayed nodes meeting the filter. The technique can be used on most linked networks.

24 Claims, 8 Drawing Sheets

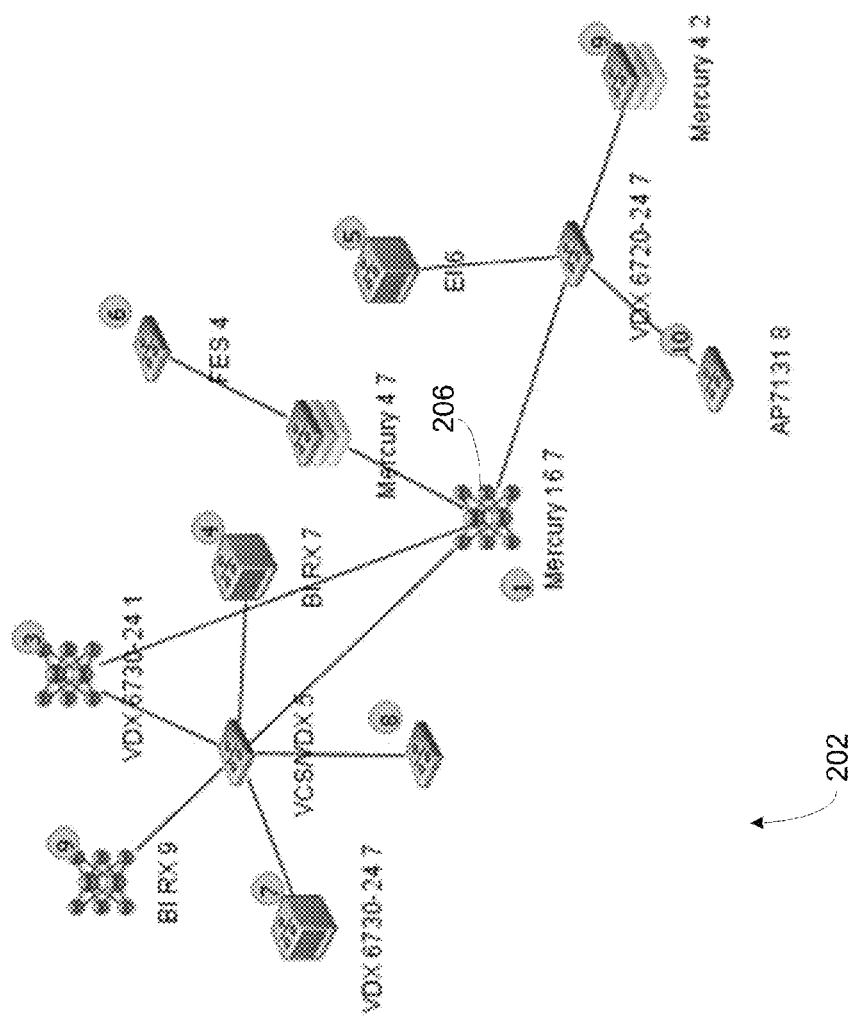

SCALABLE MAP DISPLAYS

BACKGROUND OF THE INVENTION

1. Field of the Invention

The invention relates to graphical displays of linked items, and more particularly to maps of linked network devices.

2. Description of the Related Art

Map or topological displays provide better way to represent connected data because they provide easy to understand flat, visual views of data and provide high level overview and details when needed. However, for large networks, it is often not feasible to display all elements to a user in a single view. The connectivity between the nodes is simply too big for the user to grasp the information at a glance. Current solutions offer an entire map view, with tiering or condensing occurring at certain locations or levels, or provide overview map and a current view port which shows a small portion of the overall map. However, these solutions are not scalable and not straight forward for tracking connectivity between nodes. In some cases strategies to filter and/or navigate the map display and the connectivity have been used, but that still hampers tracking connectivity and the like. Therefore a method and system to allow large connected networks to be explored interactively is needed.

SUMMARY OF THE INVENTION

A desired node is selected from a tree structure or list and then a number of levels from that node are displayed in a map. For edge nodes, the number of undisplayed links from that node is displayed to allow traversing a desired path. The number of levels is selectable. When another node is selected on the map, the number of levels is recalculated based on that node in one embodiment. In another embodiment the existing nodes remain and the desired level is additionally displayed from the selected node. Multiple nodes can be selected from the list, which may result in separated islands but the islands will join when a node is when the set number of levels of a node in the other map.

Filters can be applied to limit the number of nodes. The filtering may either remove nodes from the display or provide an indication of the number of undisplayed nodes meeting the filter and any displayed nodes meeting the filter.

The technique can be used on most linked networks, such as telecommunication networks, relationship networks and the like.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

FIG. 4 is a diagram of an island of FIG. 2 where a node has been removed.

DETAILED DESCRIPTION OF THE PREFERRED EMBODIMENTS

Figure 1:
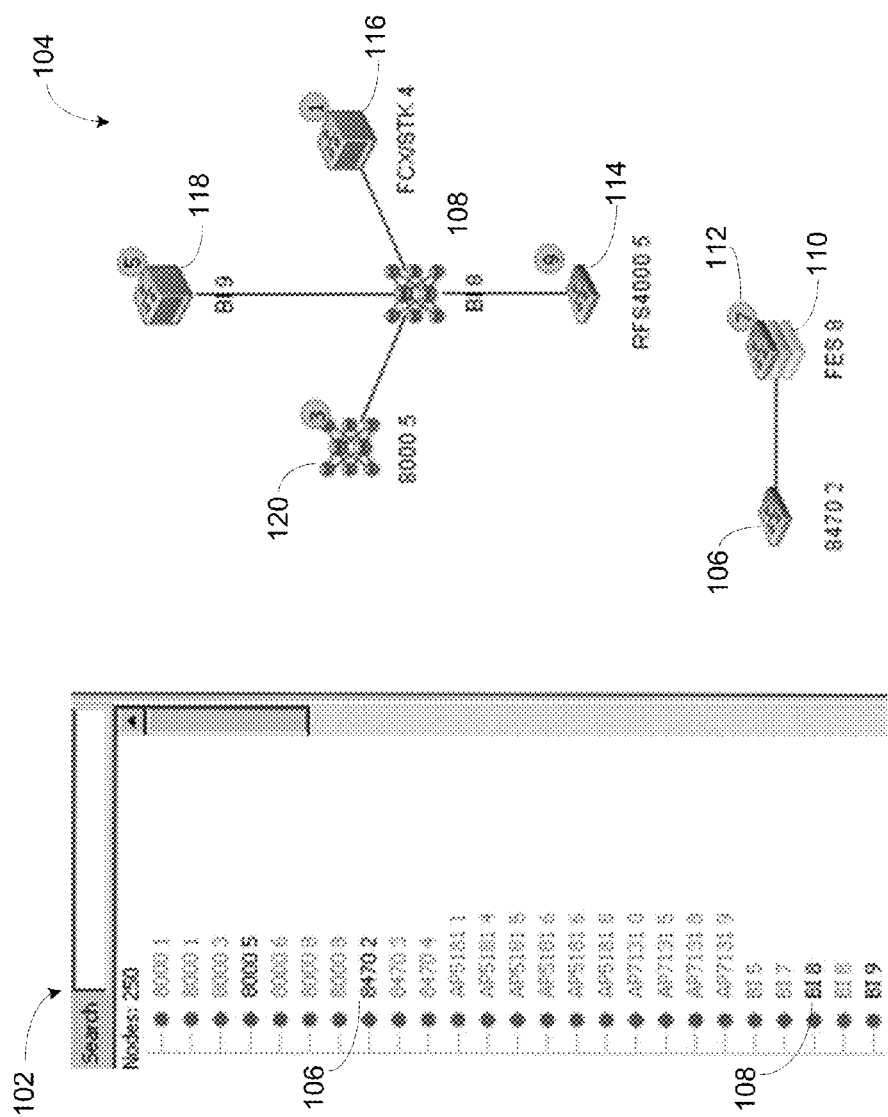
FIG. 1 is a diagram illustrating a tree structure with selected nodes and the resulting map according to the present invention.

Referring to FIG. 1, a map view according to the preferred embodiments starts with selected elements of interest. Two panes of a graphical interface are shown, a tree pane 102 and a map pane 104. Nodes 8470 2 106 and BI 8 108 are selected. The two selected nodes 106 and 108 are shown in the map pane with one level of connectivity. This results in isolated islands as the nodes 106 and 108 are not that closely connected.

The 8470 2 node 106 is shown connected to a FES 8 node 110. A number or bubble 112 is located next to the node 110 symbol. This bubble 112 indicates the number of connections from that node that are not illustrated. In the example, node 110 has seven other connections besides the one to node 106. If more levels of connectivity were selected, then these connections would be shown and the nodes at the edges of that island would similarly have connection numbers present.

The BI 8 node 108 is shown connected to RFS4000 5 node 114, FCX/STK 4 node 116, BI 9 node 118 and 8000 5 node 120. Each of those nodes has associated numbers or bubbles indicating their connections which are not illustrated.

Figure 2:
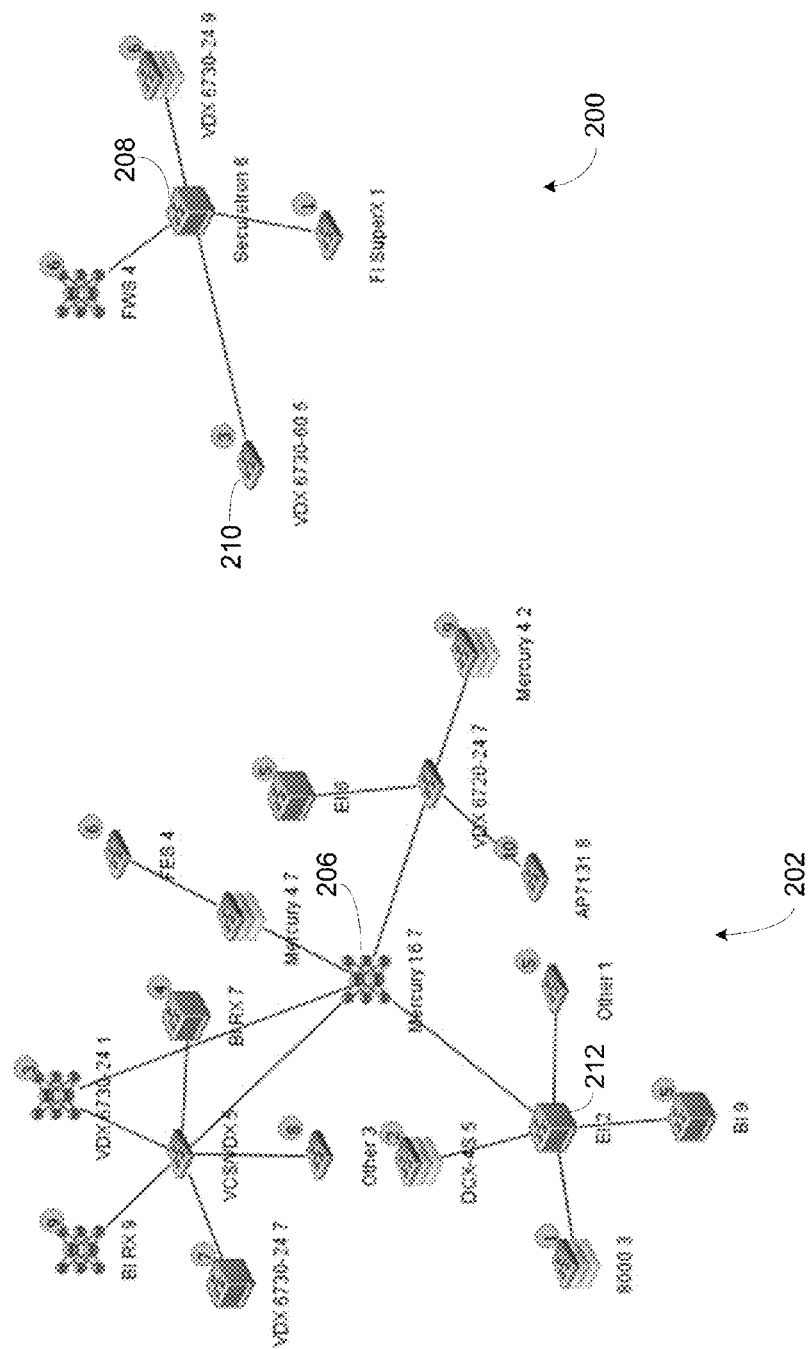
FIG. 2 is a diagram of two islands of nodes according to the present invention.

FIG. 2 illustrates a map view 200 have islands 202 and 204. The island 202 is illustrated as showing two levels of connection from Mercury 16 7 node 206. Island 204 is illustrated as showing one level of connectivity from SecureIron 6 node 208.

Figure 3A:
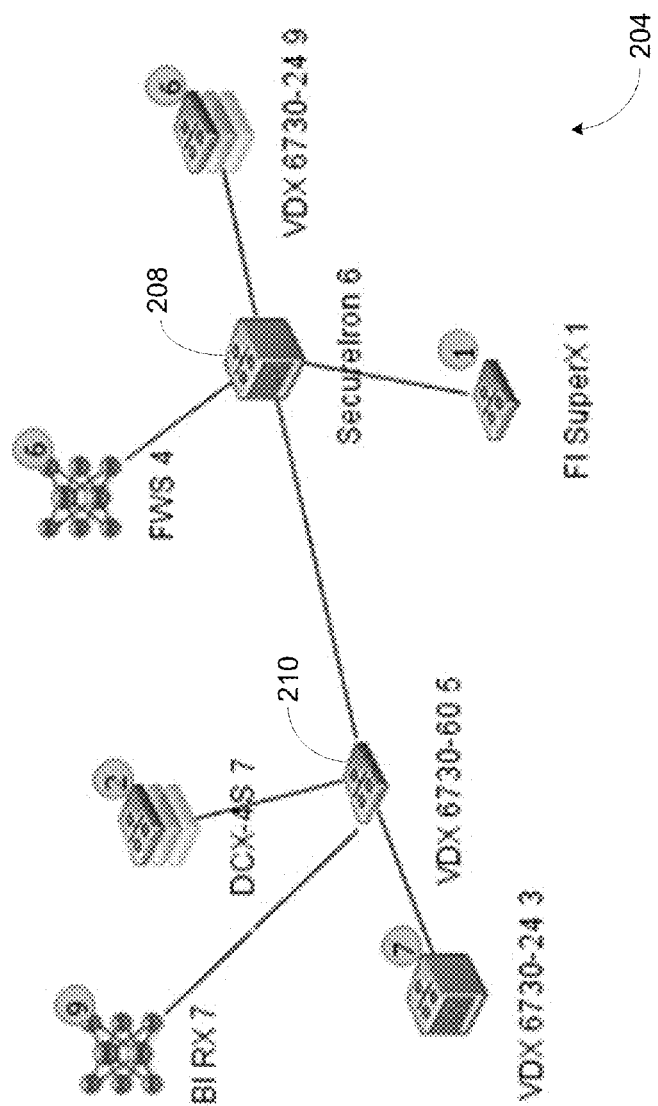
FIGS. 3A and 3B are diagrams of an island of FIG. 2 with additional nodes based on selection of an edge node.

The map view responds to user interaction when the user needs more information about the elements and thus changes the map view. FIG. 3A illustrates a first embodiment where VDX 6730-60 5 node 210 has been selected, for example by double clicking or right clicking and selecting from an option list, and an additional one level of connectivity from node 210 is added to the island 204. In this embodiment investigating from a given node expands the map view and existing nodes are not removed. This allows a user to easily map a path from one node to another node a number of levels away.

Figure 3B:
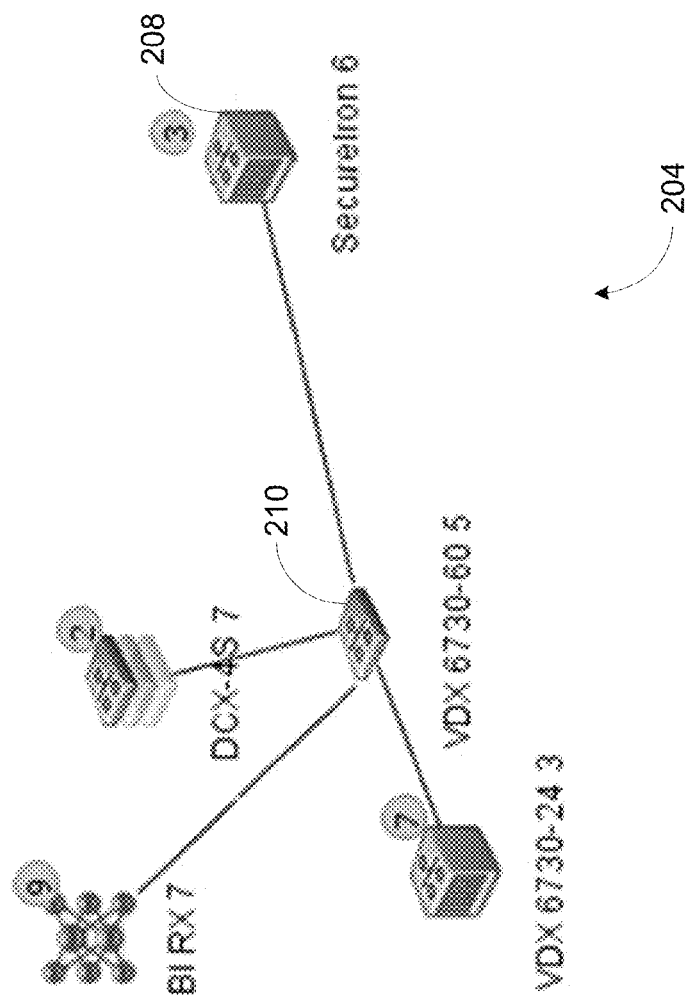

FIG. 3B illustrates a second embodiment where the node 210 has again been selected but this time only a desired level of connectivity from node 210 is shown, thus moving the center of the island from node 208 to node 210.

FIG. 4 shows the result of removing a node. Node 212, which was directly connected to node 206 has been removed, preferably by right clicking and selecting a remove or delete option. Node 212 and the nodes farther from node 206 are removed from the map and a connection number of one is provided next to node 206 to indicate the presence of one connection that is not shown, in the illustrated case to node 212.

If islands are formed as illustrated and the user traverses an island, it may be the case that eventually a node already present in another island is reached. In that instance the two islands are merged by the relevant connection.

The tree structure of pane 102 is shown with all nodes that are currently visible in the map pane 104 highlighted. In a variation, only the selected nodes can be highlighted.

Various controls can be used to limit the information shown in the topology view. These controls can be applied either globally, to the entire map pane 104, or individually to each node, if appropriate. Exemplary controls include a maximum number of nodes to explored. For this control the number of nodes shown on a single operation is limited to a designated maximum to prevent the map from getting too cluttered or the nodes too small. For example, this maximum node control could have a value between 1 to 100, with 10 selected as default value.

A second control is to limit neighbors. To limit the number of nodes shown in the topology view, a control is provided to remove nodes if the length of the shortest path from a node to any selected node is greater than a specified value. Examples of one and two levels are illustrated in the Figures. The option is turned on by default to limit the topology view. This control may be particularly appropriate to apply to individual nodes to override an overall value. For example, the control can have a value between 1 and 100, with a default value of 5.

A third control is property-based filtering. For example, only nodes having selected properties, such as ports of a particular speed or type or nodes connected within the desired limit to nodes of a particular type, can be shown. Examples include 1) display the L2 switches that are connected to hosts running Windows 2008 OS; 2) display the switches with offline devices, with the number or bubble adjacent the icon displaying the number of missing/offline end devices, with the connectivity between the device and the device being shown when the offline device is brought into the view; and 3) display the switches with top 10 power consuming connected end devices (like projectors, Ethernet phones, etc.,). Using the property-based filtering results in the display of a dynamic group of devices. A management program can take actions based on this dynamic group of devices without expanding the node. For example, if the filter criteria is switches running firmware version 5.2, the indication would be number of switches running version 5.2 and the action would be to upgrade the firmware on the group of devices to version 5.3.

Figure 7:
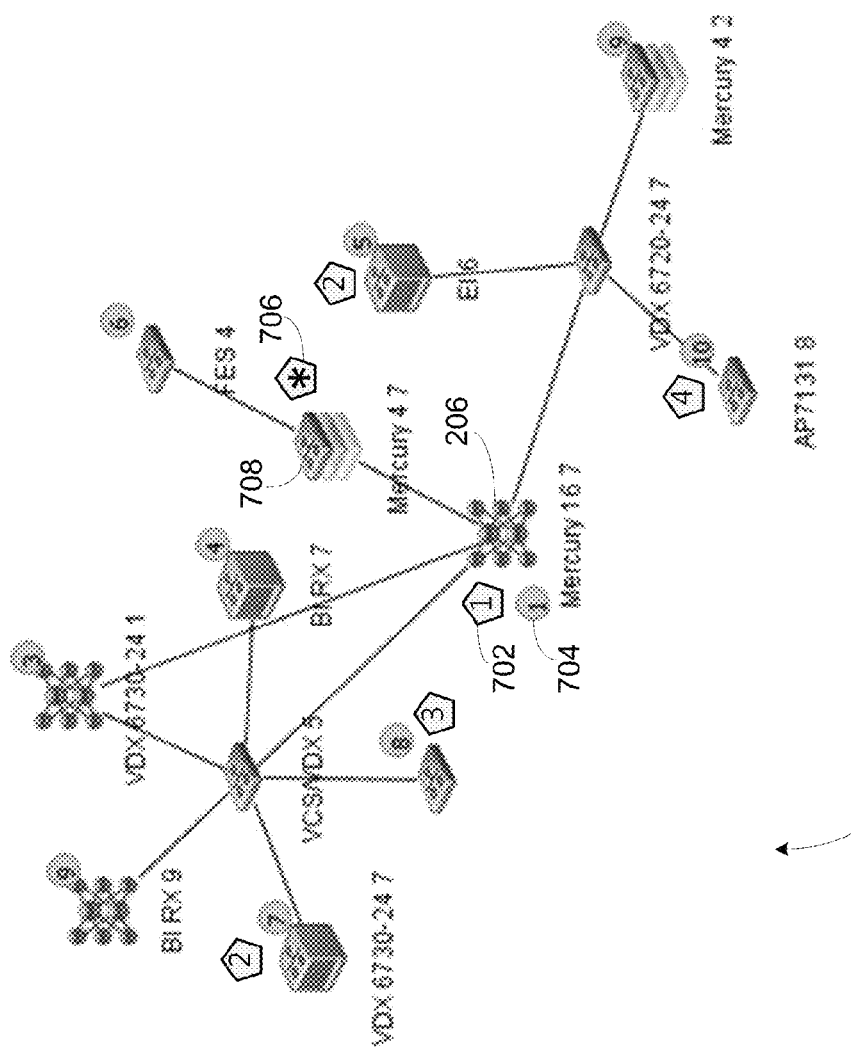
FIG. 7 is a diagram of the island of FIG. 4 illustrating an alternate embodiment according to the present invention.

In an alternate embodiment shown in FIG. 7, the number of items corresponding to the filtered results is shown in a separate number or bubble 702 in addition to the normal number or bubble 704. By providing these additional bubbles 702, a potential problem of a limited display which may result if only items according to the filtered results are shown. For example, if only switches connected to switch 206 having firmware version 5.2 were shown, then in FIG. 7, only switches 206 and 708 would be shown. Switch 708 is shown as being version 5.2 by the bubble 706 with the asterisk inside, to indicate the filter condition applies to that displayed item. Thus a large portion of the display of FIG. 7 would not be present. By using the controls other than property-based filtering to define the items displayed and then adding the filtering results in separate bubbles, then a more complete display is provided while still allowing the indication of the filter results.

While a communications network, with switches, routers and the like, has been used as the example in the Figures, the present invention can be applied to many different types of connected networks. An interconnected social network, such as LinkedIn from LinkedIn Corporation, can readily be navigated using the present invention. For a network such as LinkedIn, the property-based filtering can be very extensive and quite helpful, particularly when frill text based searching is utilized. Examples include 1) display my connections with people connected to profiles with Java in skill set and are 3 hops away or less and 2) display connections who have a Masters in Computer Engineering degree.

Figure 5:
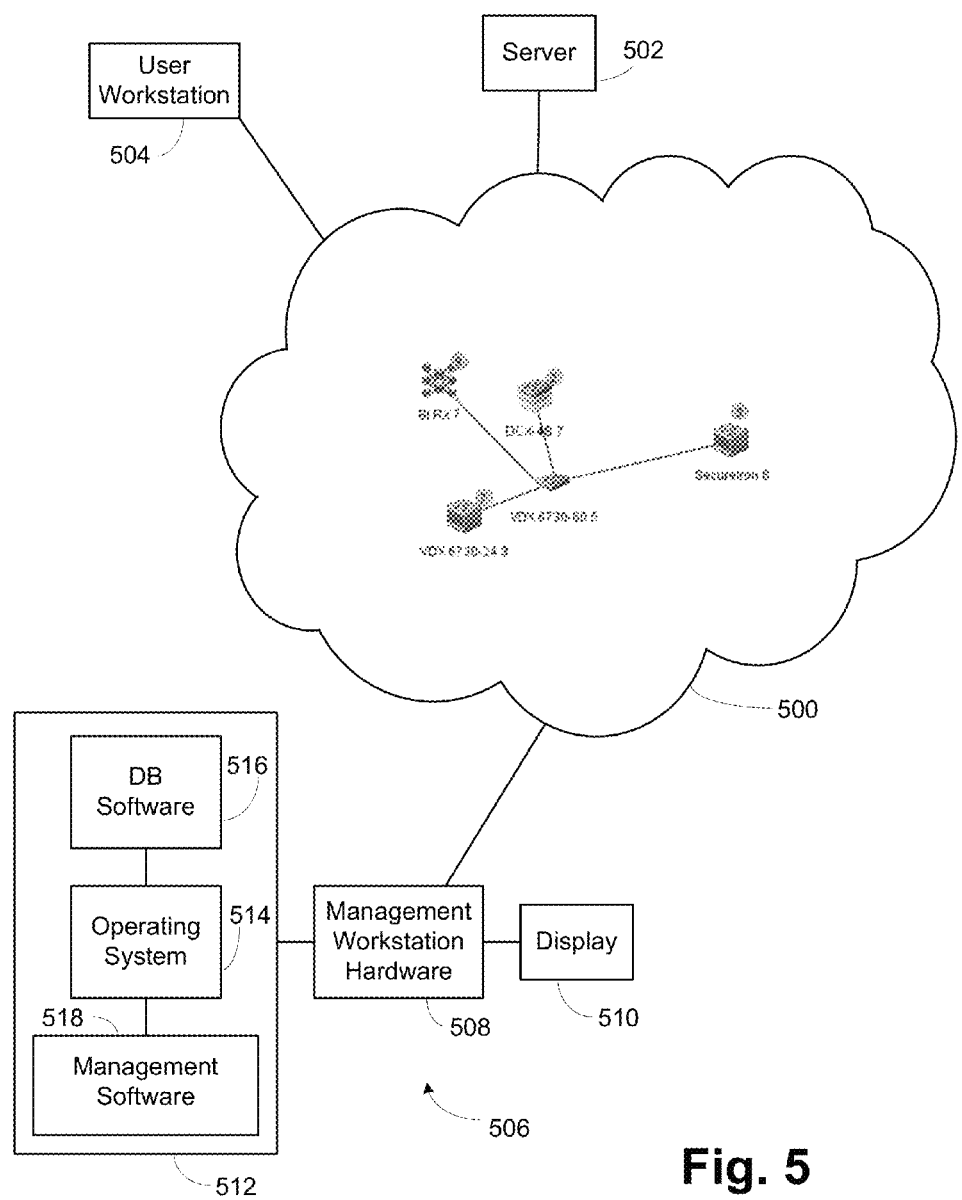
FIG. 5 is a block diagram of a management station connected to a communications network for operating according to the present invention.

FIG. 5 illustrates an example communications fabric 500, as illustrated including the island of FIG. 3B. An exemplary server 502 and user workstation 504 are connected to the network 500, it being understood that many more of each can be connected to the network in normal circumstances. A management station 506 is also connected to the network 500 to obtain the information about the connections of the network 500. Management workstation hardware 508, which includes a processor and memory as normal, is connected to a display 510 which is used to display the maps and panes according to the present invention. A storage medium 512, such as a hard disk drive, contains an operating system 514, database software 516 and management software 518. The database software 516 can be used to maintain the basic connectivity data, while the management software 518 obtains the data from the database and provides the outputs provided to the display 510. It is understood that this is an exemplary partitioning of the hardware and software used to implement embodiments according to the present invention and other variations are possible. For example, in a social networking embodiment, the database and management software can reside on servers connected to the network, the management or visualization software being accessed by a browser executing on a user workstation.

Figure 6:
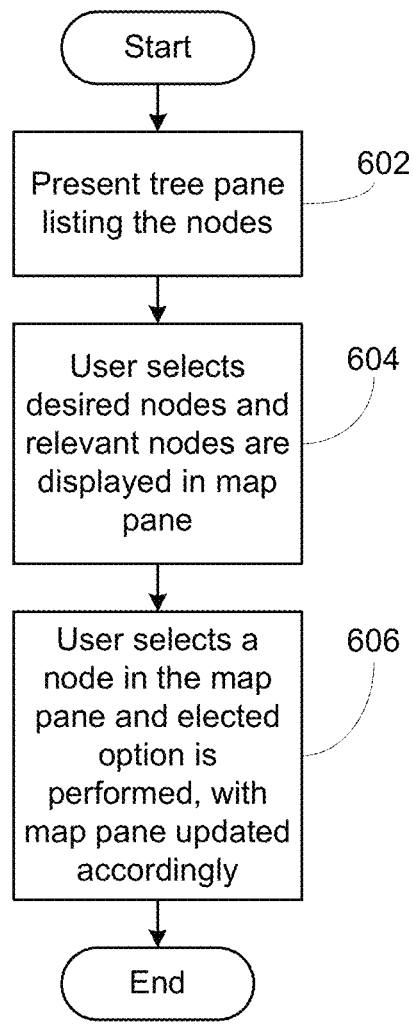
FIG. 6 is a flowchart of operations according to the present invention.

FIG. 6 provides a high level flowchart of operations. In step 602 the tree pane 102 is presented on the display 510. In step 604 the user selects the desired nodes and they are displayed in the map pane 104 on the display 510. The islands are displayed according to the default levels of connectivity and the like. In step 606 the user selects a particular node and selects an option for that node, such as extending the island from that node, deleting the node from the display or running the selected filter parameters, and the option is performed, changing the map pane accordingly.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
   displaying a list of nodes of a linked network in a list view on a computer display;
   receiving a first selection of at least one listed node from the list view;
   displaying the first selected node and nodes within a given number of links from the selected node in a map view separate from the list view on the computer display, resulting in a map view display having displayed nodes in the center and displayed nodes at the edges; and
   filtering the nodes displayed on the map view based on at least one property of the nodes.

2. The method of claim 1, wherein the filtering removes nodes from displaying on the map view.

3. The method of claim 1, further comprising:
   displaying a first indication of the number of undisplayed links for displayed nodes at the edges on the computer display, said first indication being located adjacent the respective displayed node; and
   displaying a second indication of the number of links connecting to nodes meeting the filter for displayed nodes at the edges on the computer display, said second indication being located adjacent the respective displayed node.

4. The method of claim 3, further comprising:
displaying a third indication for displayed nodes in the center for nodes meeting the filter on the computer display, said third indication being located adjacent the respective displayed node.

5. The method of claim 1, wherein a plurality of nodes are selected from the list view, and wherein the selected nodes and nodes within a given number of links from the selected nodes are displayed in a map view separate from the list view for each selected node.

6. The method of claim 1, further comprising:
receiving a second selection of a node displayed in the map; and
displaying additional nodes within a given number of links from the second selected node in a map view on the computer display.

7. The method of claim 1, further comprising:
receiving a second selection of a node displayed in the map view; and
removing the second selected node and any nodes linked only through the second selected node from the map view.

8. The method of claim 1, wherein any nodes displayed in the map view are highlighted in the list view.

9. A non-transitory computer readable storage medium or media having computer-executable instructions stored therein for an application which performs the following method, the method comprising:
displaying a list of nodes of a linked network in a list view;
receiving a first selection of at least one listed node from the list view;
displaying the first selected node and nodes within a given number of links from the selected node in a map view separate from the list view, resulting in a map view display having displayed nodes in the center and displayed nodes at the edges; and
filtering the nodes displayed on the map view based on at least one property of the nodes.

10. The non-transitory computer readable storage medium or media of claim 9, wherein the filtering removes nodes from displaying on the map view.

11. The non-transitory computer readable storage medium or media of claim 9, the method further comprising:
displaying a first indication of the number of undisplayed links for displayed nodes at the edges, said first indication being located adjacent the respective displayed node; and
displaying a second indication of the number of links connecting to nodes meeting the filter for displayed nodes at the edges, said second indication being located adjacent the respective displayed node.

12. The non-transitory computer readable storage medium or media of claim 11, the method further comprising:
displaying a third indication for displayed nodes in the center for nodes meeting the filter, said third indication being located adjacent the respective displayed node.

13. The non-transitory computer readable storage medium or media of claim 9, wherein a plurality of nodes are selected from the list view, and wherein the selected nodes and nodes within a given number of links from the selected nodes are displayed in a map view separate from the list view for each selected node.

14. The non-transitory computer readable storage medium or media of claim 9, the method further comprising:
receiving a second selection of a node displayed in the map view; and
displaying additional nodes within a given number of links from the second selected node in a map view.

15. The non-transitory computer readable storage medium or media of claim 9, the method further comprising:
receiving a second selection of a node displayed in the map view; and
removing the second selected node and any nodes linked only through the second selected node from the map view.

16. The non-transitory computer readable storage medium or media of claim 9, wherein any nodes displayed in the map view are highlighted in the list view.

17. A computer system comprising:
a processor;
a display coupled to said processor;
storage coupled to said processor and storing computer-executable instructions for an application which cause said processor to perform the following steps:
display a list of nodes of a linked network in a list view on said display;
receive a first selection of at least one listed node from the list view;
display the first selected node and nodes within a given number of links from the selected node in a map view separate from the list view, resulting in a map view display having displayed nodes in the center and displayed nodes at the edges; and
filter the nodes displayed on the map view based on at least one property of the nodes.

18. The computer system of claim 17, wherein the filtering removes nodes from displaying on the map view.

19. The computer system of claim 17, the steps further including:
displaying a first indication of the number of undisplayed links for displayed nodes at the edges, said first indication being located adjacent the respective displayed node; and
displaying a second indication of the number of links connecting to nodes meeting the filter for displayed nodes at the edges, said second indication being located adjacent the respective displayed node.

20. The computer system of claim 19, the steps further including:
displaying a third indication for displayed nodes in the center for nodes meeting the filter, said third indication being located adjacent the respective displayed node.

21. The computer system of claim 17, wherein a plurality of nodes are selected from the list view, and wherein the selected nodes and nodes within a given number of links from the selected nodes are displayed in a map view separate from the list view on said display for each selected node.

22. The computer system of claim 17, the steps further including:
receiving a second selection of a node displayed in the map view; and
displaying additional nodes within a given number of links from the second selected node in a map view on said display.

23. The computer system of claim 17, the steps further including:
receiving a second selection of a node displayed in the map view; and
removing the second selected node and any nodes linked only through the third selected node from the map view on said display.

24. The computer system of claim 17, wherein any nodes displayed in the map view are highlighted in the list view.

\* \* \* \* \*